US007085715B2

(12) United States Patent
Beaucoup et al.

(10) Patent No.: US 7,085,715 B2
(45) Date of Patent: Aug. 1, 2006

(54) METHOD AND APPARATUS OF CONTROLLING NOISE LEVEL CALCULATIONS IN A CONFERENCING SYSTEM

(75) Inventors: Franck Beaucoup, Dunrobin (CA); Michael Tetelbaum, Ottawa (CA)

(73) Assignee: Mitel Networks Corporation (CA)

( * ) Notice: Subject to any disclaimer, the term of this patent is extended or adjusted under 35 U.S.C. 154(b) by 882 days.

(21) Appl. No.: 10/044,800

(22) Filed: Jan. 10, 2002

(65) Prior Publication Data

US 2003/0130839 A1 Jul. 10, 2003

(51) Int. Cl.
*G10L 21/02* (2006.01)
*H04M 9/00* (2006.01)

(52) U.S. Cl. .................. 704/226; 704/233; 379/392.01

(58) Field of Classification Search ................ 704/226, 704/233; 379/392.01; 381/71.1
See application file for complete search history.

(56) References Cited

U.S. PATENT DOCUMENTS 5,295,225 A 3/1994 Kane et al. ................ 395/2.35
5,533,118 A * 7/1996 Cesaro et al. ............... 379/386
5,617,472 A 4/1997 Yoshida et al. ............. 379/390
5,696,821 A * 12/1997 Urbanski ............... 379/406.07
6,597,787 B1 * 7/2003 Lindgren et al. ...... 379/406.05
6,816,591 B1 * 11/2004 Terada et al. .......... 379/406.01

FOREIGN PATENT DOCUMENTS

| | | |
|---|---|---|
| CA | 2309525 | 11/2000 |
| JP | 2000305579 | * 11/2000 |
| JP | 2000305579 A | 11/2000 |

* cited by examiner

*Primary Examiner*—V. Paul Harper
(74) *Attorney, Agent, or Firm*—Marger Johnson & McCollom, P.C.

(57) ABSTRACT

Apparatus for controlling noise characteristic estimation in a conferencing system, comprising a noise characteristic estimator for estimating a noise characteristic of a signal of interest transmitted in a first direction through the conferencing system, and a first voice activity detector for detecting audio signal activity in a signal transmitted through the conferencing system in a direction opposite to the signal of interest and in response disabling the noise characteristic estimator.

8 Claims, 5 Drawing Sheets

METHOD AND APPARATUS OF CONTROLLING NOISE LEVEL CALCULATIONS IN A CONFERENCING SYSTEM

FIELD OF THE INVENTION

This invention relates generally to audio conferencing systems, and more particularly to a method and apparatus for controlling noise level calculations in a conferencing system based on voice activity in a signal direction opposite to a that of a signal of interest.

BACKGROUND OF THE INVENTION

In an audio conferencing system, whether full-duplex or half-duplex, it is useful to keep track of the noise level in both the incoming (line-in) and the outgoing direction (line-out). For reasons related to echo cancellation though, speech activity in the opposite direction of the signal of interest (that is, near-end speech for line-in signal and far-end speech for line-out signal) may cause artificial fluctuations in the noise level that needs to be estimated. In other words, the absence of speech activity in the signal of interest does not guarantee that this portion of the signal represents the actual background noise of the signal of interest. Thus, where the signal of interest is the line-in signal, the echo canceller on the far-end side either shuts down its transmit signal (in the case of a half-duplex device), or applies a "Non Linear Processor" (in the case of a full-duplex device) during speech activity in the received signal (near-end speech). This results in signal level variations in the 'line-in' signal during such near end speech activity which is misinterpreted as far end noise due to the absence of far-end speech. A similar analysis applies to the noise level estimation of the line-out signal during far-end speech activity. In both cases, as indicated above, undesirable signal level variations result that may affect noise level estimations of the signal during speech (or tone) activity on the signal in the opposite direction.

Methods are well known in the art for tracking the level of the portions of a signal that are free of speech (or in-band tones) to perform noise level estimation. Thus, the prior art teaches the use of voice activity detection on a signal of interest to control noise level estimation on the signal. Example of such prior an systems are set forth in:

[1]"Noise signal prediction system". Joji Kane and Akira Nohara . U.S. Pat. No. 5,295,225.

[2]"Noise suppression of acoustic signal in telephone set". Toshio Yoshida and Michitaka Sisido. U.S. Pat. No. 5,617,472.

[3]"Method of detecting silence in a packetized voice stream". Franck Beaucoup. Canadian Patent Application No 2,309,524, published Nov. 28, 2000.

None of the prior art, however, addresses the issue of noise level fluctuations due to speech activity on the signal in an opposite direction to the signal of interest. Consequently, the prior art systems discussed above may suffer from the aforementioned noise level fluctuations. The gravity of such consequences depends on the particular system; and in particular on how much tracking ability the application requires from the noise level estimation.

SUMMARY OF THE INVENTION

According to the present invention, voice activity detection is applied to both the signal of interest and to the signal of opposite direction to the signal of interest itself in order to control the noise level calculation on the signal of interest. The method and apparatus of the present invention reduces the sensitivity of the noise level calculation to noise level fluctuations in the opposite direction signal, and therefore obtains a more accurate noise level estimation of the signal of interest.

BRIEF DESCRIPTION OF THE DRAWINGS

A detailed description of the invention is set forth herein below, with reference to the drawings, in which.

DETAILED DESCRIPTION OF THE PREFERRED EMBODIMENT

Figure 1A:
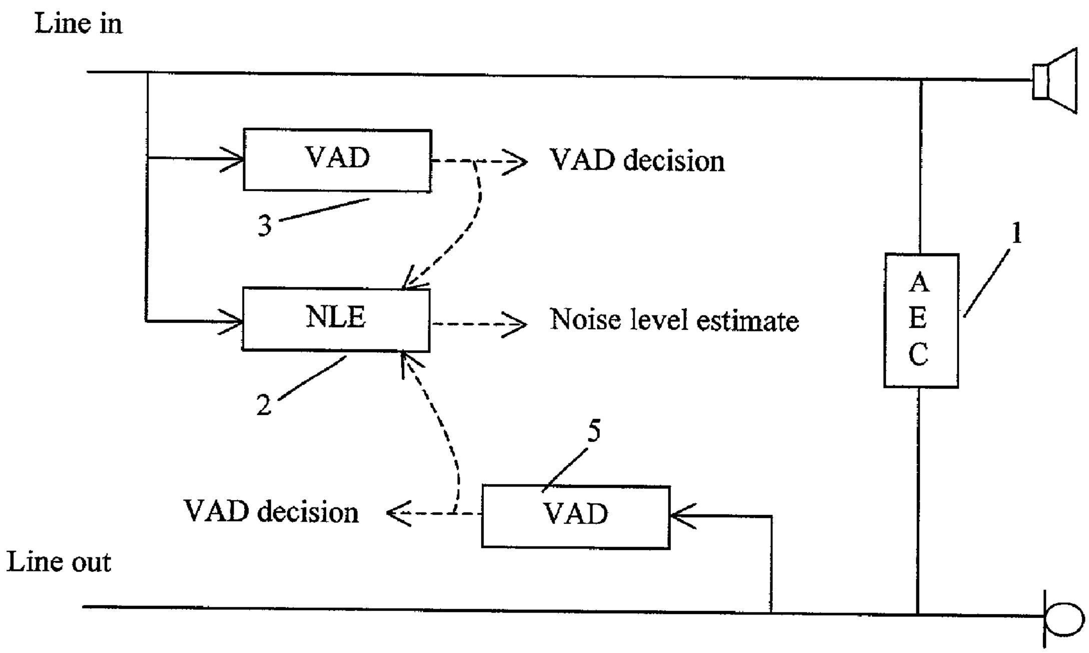
FIGS. 1*a* and 1*b* are block diagrams of a line-in noise level estimator in accordance with first and second embodiments of the present invention.

Turning to FIG. 1*a*, conferencing system is shown incorporating an Acoustic Echo Canceller (AEC) block 1, as is well known in the prior art. In order to estimate and track the noise level of the incoming (line-in) signal, a Noise-Level-Estimator (NLE) block 2 is provided in the line-in signal path. As is also known in the prior art, the NLE block 2 is controlled by a Voice-Activity-Detector (VAD) block 3 on the line-in signal, so that only segments free of speech are used to update the noise level calculation. However, in accordance with the present invention, another VAD block 5 on the line-out signal to ensure that the calculations in the NLE block 2 are also frozen during near-end speech. Preferably, the VAD block 3 includes a delay chosen to account for the network round-trip delay.

Figure 1B:
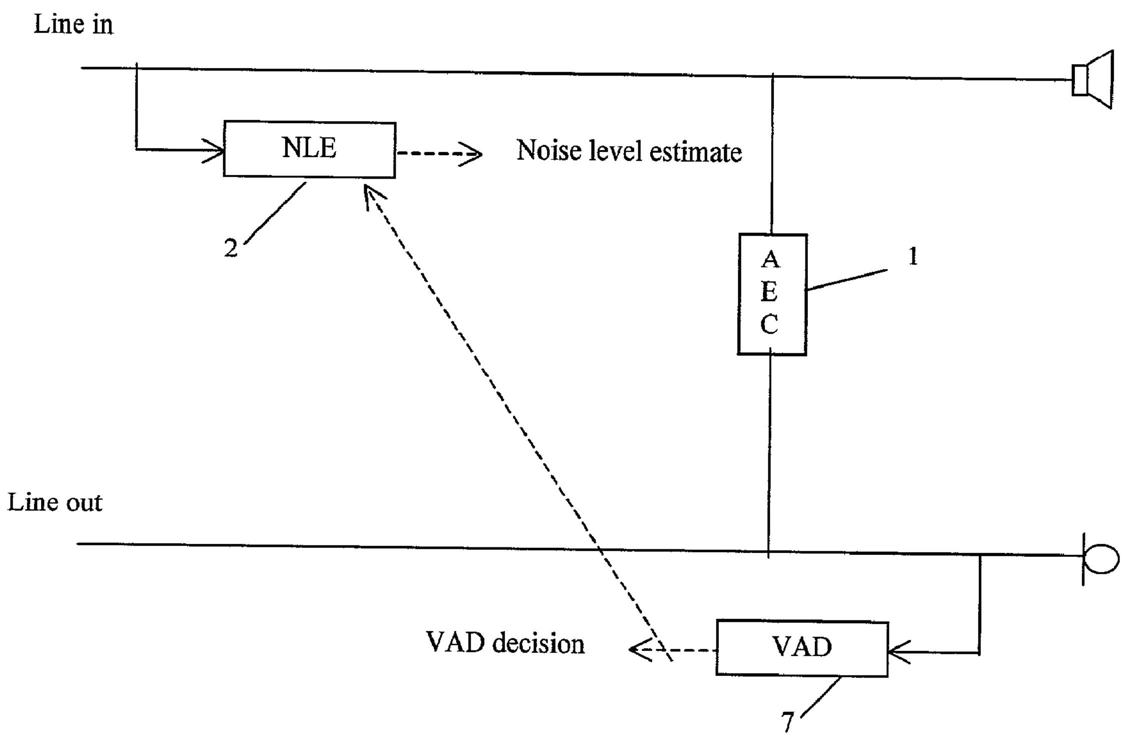

Instead of using first and second VAD blocks 3 and 5 after the AEC block 1, it is also possible to use only one VAD block 7 located on the line-out signal before the AEC block 1, as shown in FIG. 1*b*. The VAD block 7 indicates both far-end (through the echo signal) and near-end speech and therefore freezes the calculations in the NLE block 2 in both cases.

Figure 2A:
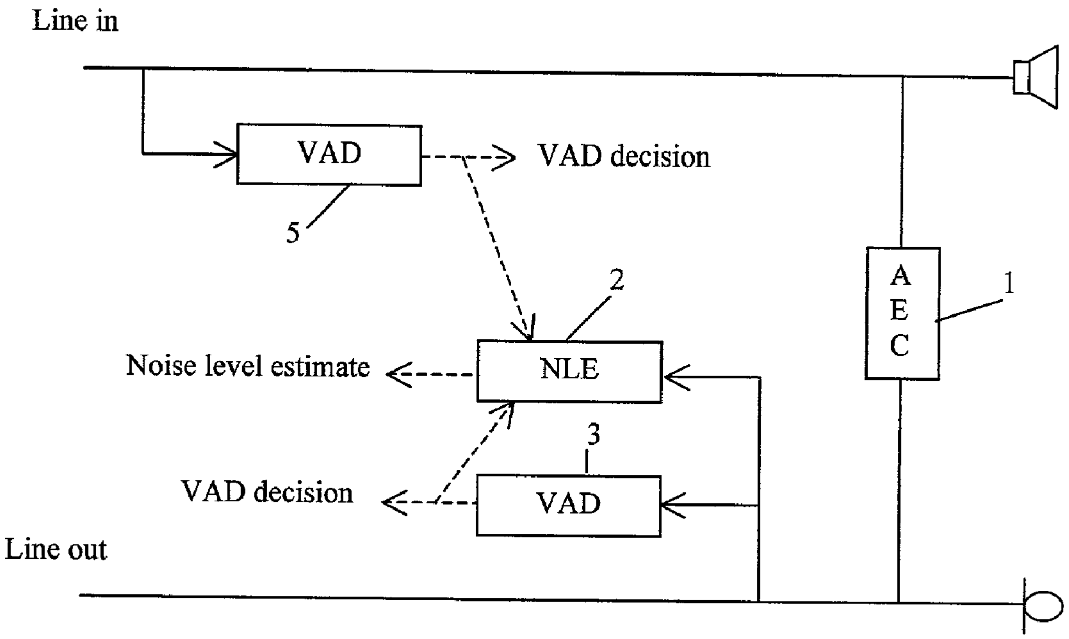
FIGS. 2*a* and 2*b* are block diagrams of line-out noise level estimators in accordance with an alternative embodiment of the present invention.
Figure 2B:
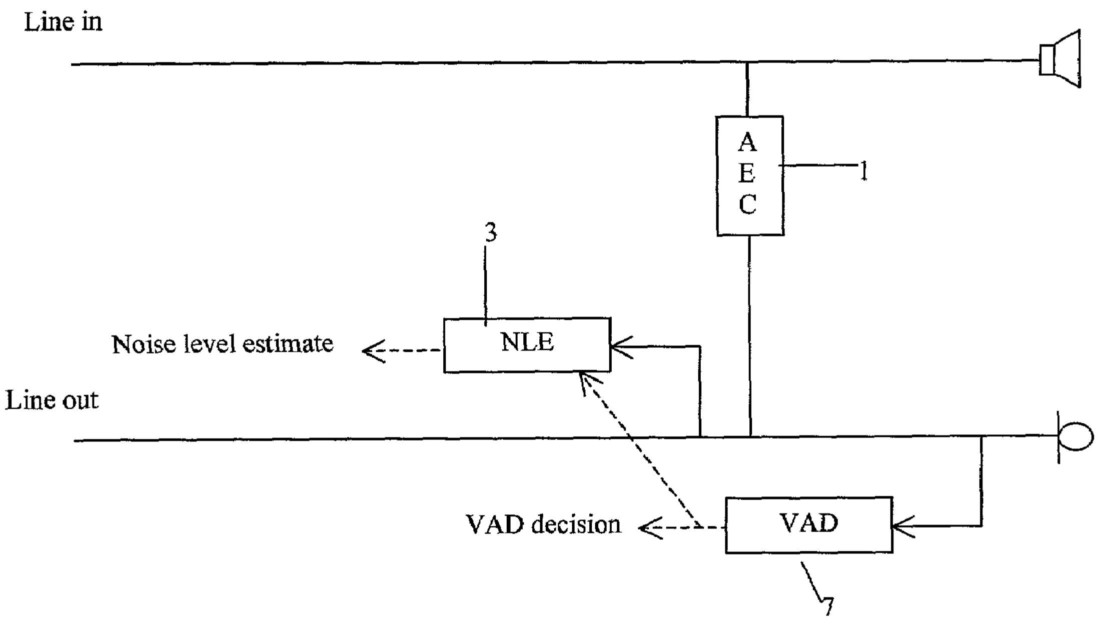

In FIGS. 2*a* and 2*b*, equivalent block diagrams are provided to show the noise level estimation concepts of FIG. 1*a* and 1*b*, respectively, applied to the case where the signal of interest is the line-out signal.

Figure 3:
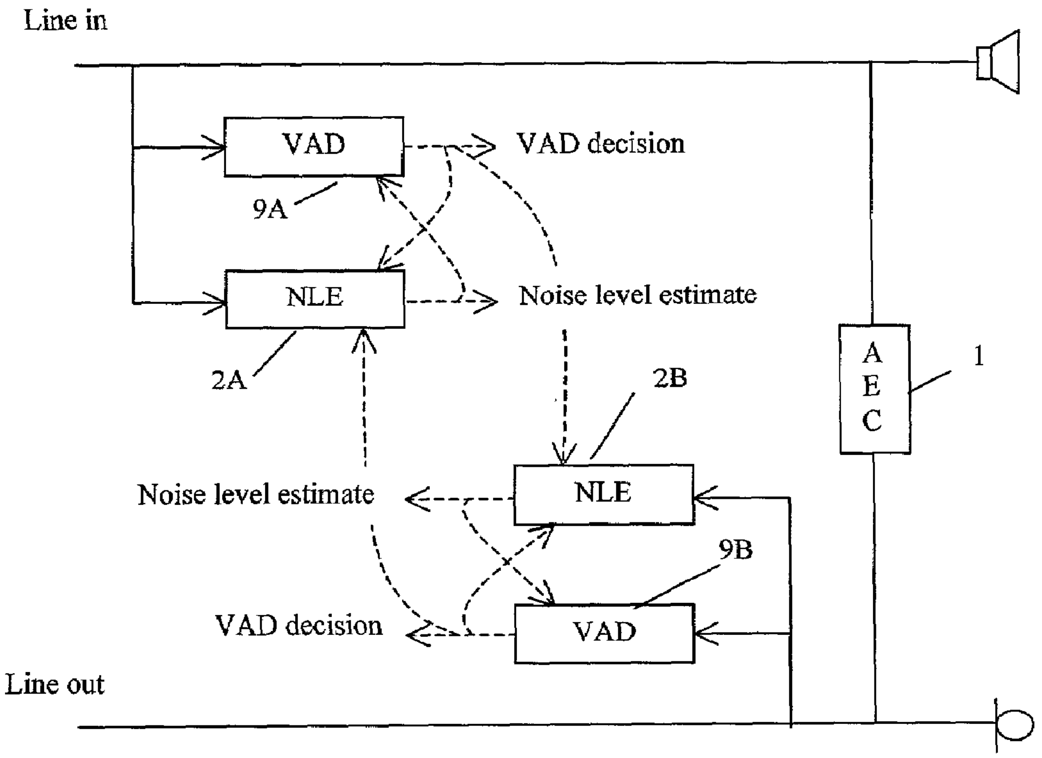
FIG. 3 is a block diagram of line-in and line-out noise level estimator in accordance with the preferred embodiment.

In some cases (e.g. energy/level based voice activity detection) the algorithm used in the VAD block itself requires an estimate of the noise level of the signal it operates on. In such cases, the symmetrical embodiment of FIG. 3 can be used. Each NLE block 2A and 2B feeds its noise level estimates into the VAD blocks 9A and 9B, respectively, of the same signal, and is controlled by both VAD blocks (9A and 9B). More particularly, the VAD block outputs (i.e. 'voiced'/ 'unvoiced' decisions) control the NLE blocks 2A and 2B. Whenever a controlling VAD's output indicates a 'voiced' segment in the signal the noise level calculation in a controlled NLE block is disabled (i.e. the NLE is 'frozen').

Variations and modifications of the invention are contemplated. Although the present invention applies specifically to audio signals, it can be used in applications where audio is not the only aspect of the system, for instance in combined audio-video conferencing systems. Also, the present invention applies not only to noise level calculations but more generally to the estimation of any characteristics of the background noise of a signal in any audio conferencing system.

All such alternative embodiments are believed to fall within the sphere and scope of the invention as defined by the appended claims.

The invention claimed is:

1. For use in a conferencing system incorporating noise characteristic estimation of a first of two bidirectionally transmitted signals, the improvement comprising detecting at least one of voice activity and in-band tone activity in a signal transmitted in a first direction opposite to said first signal and in response ceasing said noise characteristic estimation and further comprising detecting at least one of voice activity and in-band tone activity in said first signal and in response ceasing said noise characteristic estimation in a direction of said first signal.

2. The improvement of claim 1, wherein said noise characteristic is noise level.

3. The improvement of claim 1, wherein said noise characteristic is noise level.

4. Apparatus for controlling noise characteristic estimation in a conferencing system, comprising:

a first noise characteristic estimator for estimating a noise characteristic of a signal of interest transmitted in a first direction through said conferencing system;

a first voice activity detector for detecting at least one of voice activity and in-band tone activity in a signal transmitted through said conferencing system in a direction opposite to said signal of interest and in response disabling the first noise characteristic estimator, a second noise characteristic estimator for estimating a noise characteristic of a signal of interest transmitted in a direction opposite to said first direction, through said conferencing system; and a second voice activity detector for detecting at least one of voice activity and in-band tone activity in a signal transmitted through said conferencing system in said first direction and in response disabling the second noise characteristic estimator.

5. The apparatus of claim 4, wherein said noise characteristic is noise level.

6. A conferencing system, comprising:

a line input for receiving a line-in audio signal from an audio signal line;

a line output for transmitting a line-out audio signal to said audio line;

a speaker connected to said line input for broadcasting said line-in audio signal;

a microphone connected to said line output for applying said line-out audio signal to said line output;

an echo canceller connected to said line input and said line output for canceling echo signals of said line-in audio signal appearing in said line-out audio signal;

at least two noise level estimators, one of said noise level estimators for estimating noise level in said line-in audio signal and the other of said noise level estimators for estimating noise level in said line-out audio signal; and at least two voice activity detectors, one of said voice activity detectors for detecting voice activity in said line-in audio signal and in response disabling said other of said noise level estimators, and the other of said voice activity detectors for detecting voice activity in said line-out audio signal and in response disabling said one of said noise level estimators.

7. The conferencing system of claim 6, wherein said other of said voice activity detectors is connected to said line-output and said echo canceller, and said one of said voice activity detectors is connected to said line input.

8. The conferencing system of claim 6, wherein said other of said voice activity detectors is connected to said microphone and said echo canceller.

* * * * *